Figure 1:
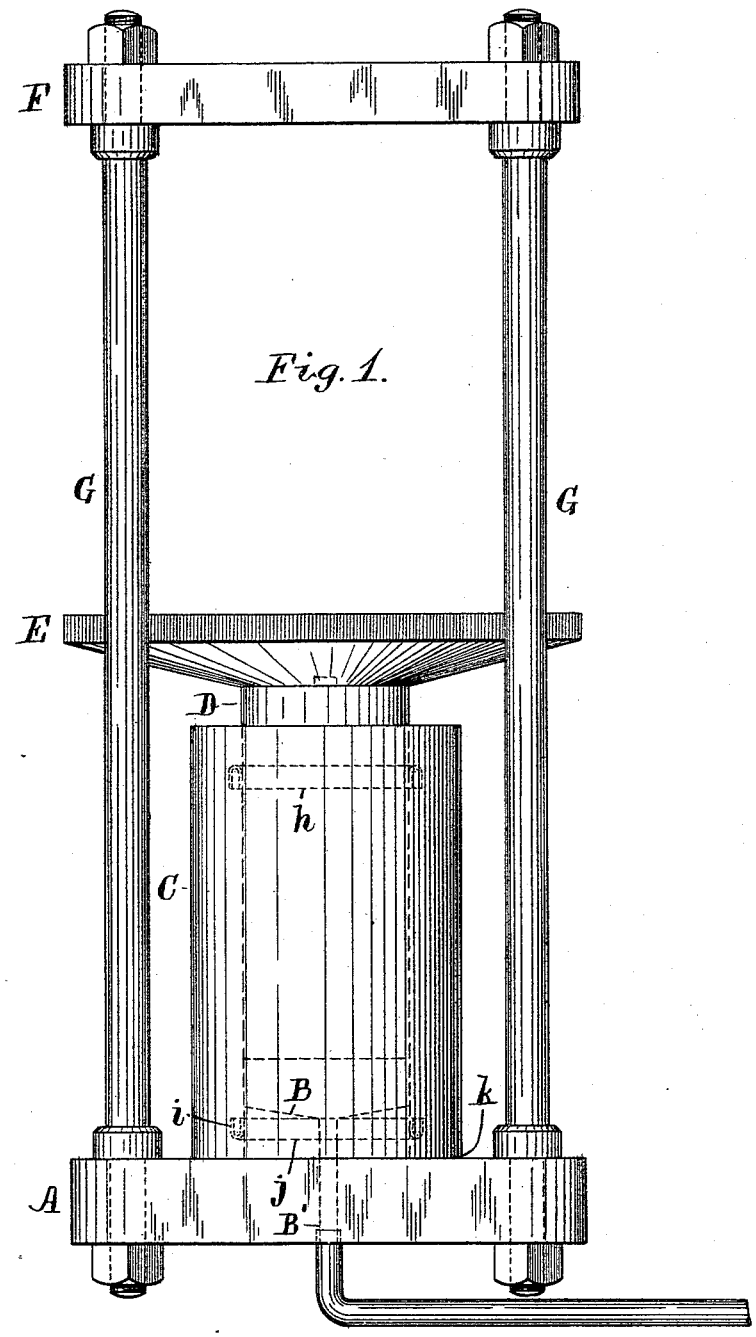

(No Model.) 2 Sheets—Sheet 1.

W. R. HINSDALE.
HYDRAULIC CYLINDER.

No. 458,300. Patented Aug. 25, 1891.

Attest:
L. Lee.
J. Van Nest Jr.

Inventor.
William R. Hinsdale,
per Crane & Miller, attys.

(No Model.) 2 Sheets—Sheet 2.
W. R. HINSDALE.
HYDRAULIC CYLINDER.
No. 458,300. Patented Aug. 25, 1891.
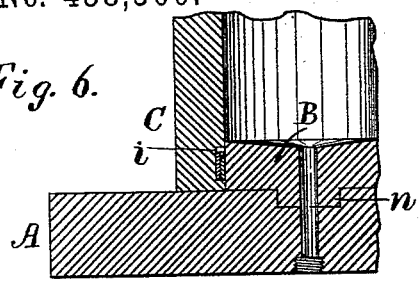
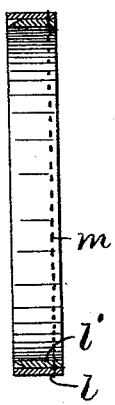
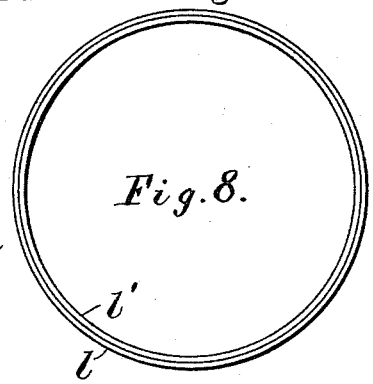
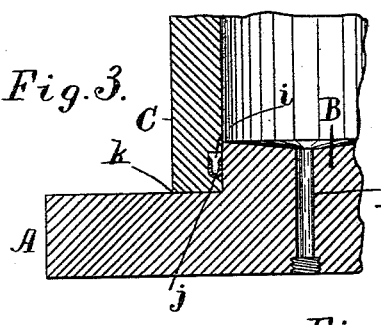
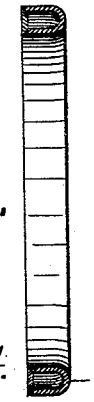
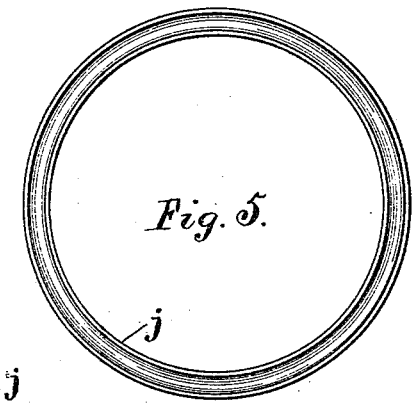
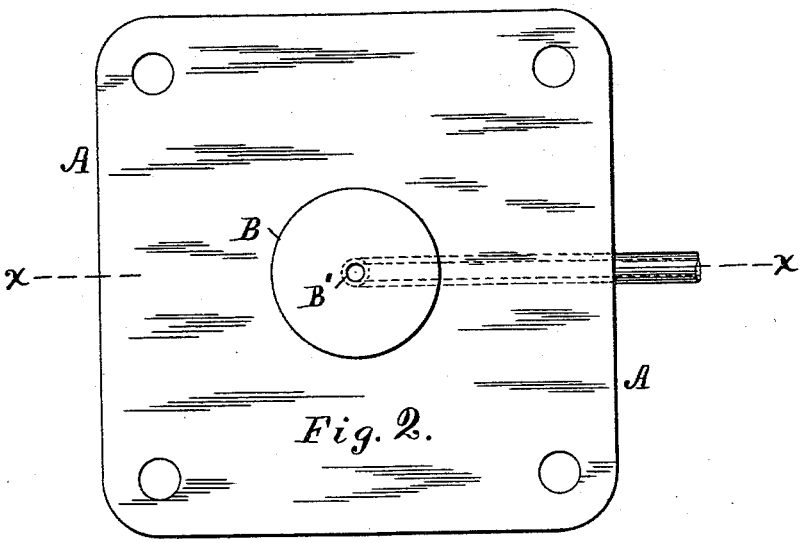
Attest:
L. Lee.
J. Van Nest Jr.
Inventor.
William R. Hinsdale,
per Crane & Miller, Attys.

UNITED STATES PATENT OFFICE.

WILLIAM R. HINSDALE, OF NEWARK, NEW JERSEY.

HYDRAULIC CYLINDER.

SPECIFICATION forming part of Letters Patent No. 458,300, dated August 25, 1891.

Application filed January 20, 1891. Serial No. 378,395. (No model.)

*To all whom it may concern:*

Be it known that I, WILLIAM R. HINSDALE, a citizen of the United States, residing at Newark, Essex county, New Jersey, have invented certain new and useful Improvements in Hydraulic Cylinders, fully described and represented in the following specification and the accompanying drawings, forming a part of the same.

The object of this invention is to furnish a means for forming a water-tight joint between the cylinders and heads of hydraulic presses without requiring bolts or tie-rods to maintain the joint between such parts.

The invention consists in a hydraulic cylinder comprising a straight cylindrical shell and a hub or plug fitted thereto and a base for sustaining such members, an annular groove closed at both ends being formed in one of the said members at their joint and a laterally-expansible packing-ring being inserted in the said groove in contact with the adjacent periphery of the other member. By thus forming the groove wholly within one of the members the longitudinal pressure of the fluid therein is balanced at the ends, and only the lateral pressure upon the packing (into which the fluid penetrates) operates to press such members apart without producing any tendency to effect their relative lateral displacement. The fluid-pressure upon the head is thus limited entirely to the circular area of the hub within the cylinder, and such pressure operates longitudinally upon the head without exerting any thrust upon the cylinder.

The invention will be understood by reference to the annexed drawings, in which—

Figure 1 is an elevation of a hydraulic press provided with my improvement. Fig. 2 is a plan of the bed-plate, forming the lower cylinder-head. Fig. 3 is a section of the lower end of cylinder and portion of the head, showing the construction and arrangement of the packing. Fig. 4 is a transverse section, and Fig. 5 a plan, of the cup-leather packing shown in Fig. 3. Fig 6 is a section similar to Fig. 3 with a sewed leather packing, and Figs. 7 and 8 are a section and plan of such sewed packing.

A is the base of the press; B, the hub or boss formed upon the same to fit the lower end of the cylinder and constituting the lower cylinder-head C, and B' an aperture through the base and hub to admit the fluid under pressure.

D is the hydraulic plunger; E, the platen of the press; F, the upper head, and G the tie-rods connecting the same to the head A. The plunger B is packed by a cup-leather $h$, fitted in an annular groove near the top of the cylinder, as is usual, and it is well understood that such packing by its pressure against the cylindrical side of the plunger limits the fluid-pressure entirely to the bottom end of the plunger and causes its movement without producing any longitudinal thrust whatever upon the cylinder.

To effect the desired connection between the cylinder and the hub B, I form an annular groove $i$, having shoulders at its ends within the cylinder near its bottom end, and insert a packing $j$ therein at a suitable distance from the end of the cylinder to press upon the side of the hub B when the cylinder is placed upon the latter, as shown in Figs. 1, 3, and 6. The packing $j$ must be made laterally expansible in order to arrest the fluid which presses from the interior of the cylinder toward the joint at the end of the cylinder indicated by the reference-letter $k$ in Figs. 1 and 3.

In Figs. 1 and 3 a cup-leather packing is shown fitted in the groove adjacent to the hub B, such packing being constructed of the usual form indicated in Figs. 4 and 5, and an alternative construction is shown in Figs. 7 and 8, formed of two annular strips $l$ $l'$, joined by a line of stitching $m$ at one edge. Such a sewed packing is already known as a substitute for the cup-leather packing, and operates in precisely the same manner as indicated in Fig. 6. It will be readily perceived that the only pressure upon the hub B is a longitudinal thrust toward the base A, and that it is not therefore necessary that it should be attached to such base to perform its functions. I have therefore shown in Fig. 6 the hub formed separate from the base and centered thereon by a central stud $n$, which prevents the hub and cylinder from lateral displacement.

Where it is desirable to use a hydraulic piston having a piston-rod extended through a stuffing-box, both the heads of the cylinder may be formed of the hubs B and the end strain upon the heads sustained by tie-rods, as usual. The advantage of this construction is that the straining of the tie-rods which may permit a slight yielding of the heads will not cause any leakage between the heads and cylinder, as when the joint is made at the end of the cylinder. Where a full-sized plunger is fitted to one end of the cylinder, as in Fig. 1, the pressure does not produce any longitudinal strain upon the cylinder, and the latter therefore requires no fastening whatever.

By my improvement the construction of a hydraulic press is not only rendered exceedingly cheap and simple, but the durability of the joint between the head and the cylinder is greatly increased.

I am aware that heretofore an annular packing-recess has been formed between a cylinder and a plug fitted in the end of the same, of which one end was formed by each of such members, as in United States Patent No. 265,229, dated September 26, 1882; but in such case the packing was rendered effective only by clamping the same longitudinally within the recess, thereby necessitating means of attachment of the plug and cylinder to secure the efficiency of the packing, for if the said fastenings were omitted the fluid, upon penetrating into the recess, would operate to force its ends apart and displace the said members longitudinally with relation to each other. By my construction the longitudinal thrusts in both directions of the fluid penetrating the inner portion of the joint and entering the packing-recess are sustained by a single member, and being offset against each other obviate the necessity of securing the head to the cylinder to prevent their relative longitudinal displacement. I hereby disclaim the said patent.

I also disclaim the United States Patent No. 159,326, dated February 2, 1875, which shows a packing-ring substantially like the one employed by me. My invention relates to a hydraulic cylinder having a latterly expansible packing applied wholly on one side of the longitudinal joint between a straight cylindrical shell and a plug or hub fitted to the bore of the same, and does not include any particular form of packing of the class above specified.

Having thus set forth my invention, what I claim herein is—

As a new article of manufacture, a hydraulic cylinder comprising the straight cylindrical shell C and the hub or plug B, fitted thereto, and the base A for sustaining such members, an annular groove $i$, closed at both ends, being formed in one of the said members at their joint, and a laterally-expansible packing-ring $j$ being inserted in the said groove in contact with the adjacent periphery of the other member, as shown and described, and for the purpose set forth.

In testimony whereof I have hereunto set my hand in the presence of two subscribing witnesses.

WILLIAM R. HINSDALE.

Witnesses:
GEORGE C. MILLER,
HENRY J. MILLER.